United States Patent
Pereira et al.

(10) Patent No.: US 7,761,298 B1
(45) Date of Patent: Jul. 20, 2010

(54) DOCUMENT EXPANSION IN SPEECH RETRIEVAL

(75) Inventors: Fernando Carlos Pereira, Westfield, NJ (US); Amitabh Kumar Singhal, Redwood City, CA (US)

(73) Assignee: AT&T Intellectual Property II, L.P., New York, NY (US)

( * ) Notice: Subject to any disclaimer, the term of this patent is extended or adjusted under 35 U.S.C. 154(b) by 0 days.

(21) Appl. No.: 12/013,692

(22) Filed: Jan. 14, 2008

Related U.S. Application Data

(63) Continuation of application No. 11/466,815, filed on Aug. 24, 2006, now Pat. No. 7,395,207, which is a continuation of application No. 09/740,284, filed on Dec. 19, 2000, now Pat. No. 7,113,910.

(60) Provisional application No. 60/183,397, filed on Feb. 18, 2000.

(51) Int. Cl.
*G10L 15/00* (2006.01)
(52) U.S. Cl. .................................... 704/257
(58) Field of Classification Search ............... 704/257, 704/277
See application file for complete search history.

(56) References Cited

U.S. PATENT DOCUMENTS

| | | | | |
|---|---|---|---|---|
| 5,559,940 A | | 9/1996 | Hutson | |
| 5,640,553 A | * | 6/1997 | Schultz | 707/5 |
| 5,659,742 A | * | 8/1997 | Beattie et al. | 707/104.1 |
| 5,675,788 A | * | 10/1997 | Husick et al. | 707/104.1 |
| 5,950,189 A | | 9/1999 | Cohen et al. | |
| 6,418,431 B1 | * | 7/2002 | Mahajan et al. | 707/4 |
| 7,113,910 B1 | * | 9/2006 | Pereira et al. | 704/270 |
| 7,395,207 B1 | * | 7/2008 | Pereira et al. | 704/270 |

OTHER PUBLICATIONS

Choi et al. "An Overview of the AT&T Spoken Document Retrieval" Feb. 1998, Proceedings of the Broadcast News Transcription and Understanding Workshop, pp. 182-190.

Singhal et al. "AT&T at TREC-7" in Proceedings of the Seventh Text Retrieval Conference, pp. 239-252, Jul. 1999.

* cited by examiner

*Primary Examiner*—Michael N Opsasnick

(57) ABSTRACT

Methods of document expansion for a speech retrieval document by a recognizer. A database of vectors of automatic transcriptions of documents is accessed and the vectors are truncated by removing all terms that are not recognizable by the recognizer to create truncated vectors. Terms in the vectors are then weighted to associate the truncated vectors with the untruncated vectors. Terms not recognized by the recognizer are then added back to the weighted, truncated vectors. The retrieval effectiveness may then be measured.

16 Claims, 6 Drawing Sheets

FIG. 2

| CODE | PROVIDED BY | WER |
|---|---|---|
| HUMAN | NIST | 0% |
| CUHTK-S1 | CAMBRIDGE UNIVERSITY | 24.8% |
| DRAGON98-S1 | DRAGON SYSTEMS | 29.8% |
| ATT-S1 | AT&T LABS | 31.0% |
| NIST-B1 | CARNEGIE MELON (CMU) | 34.1% |
| SHEF-S1 | SHEFFIELD UNIVERSITY | 36.8% |
| NIST-B2 | CARNEGIE MELLON (CMU) | 46.9% |
| DERASRU-S2 | DERA | 61.5% |
| DERASRU-S1 | DERA | 62.2% |

FIG. 4

| DEGREE OF EXPANSION | IN ROCCHIO | | | |
|---|---|---|---|---|
| | 0.5 | 1.0 | 1.5 | 2.0 |
| 0% | 0.4739 | 0.4656 | 0.4591 | 0.4556 |
| 10% | 0.4898 | 0.4834 | 0.4756 | 0.4708 |
| 20% | 0.4938 | 0.4866 | 0.4813 | 0.4763 |
| 50% | 0.4990 | 0.4977 | 0.4898 | 0.4800 |
| 100% | 0.4992 | 0.4995 | 0.4952 | 0.4892 |
| 200% | 0.4943 | 0.4974 | 0.4923 | 0.4858 |

DOCUMENT EXPANSION IN SPEECH RETRIEVAL

RELATED APPLICATIONS

This application is a continuation of U.S. patent application Ser. No. 11/466,815, filed Aug. 24, 2006, now issued as U.S. Pat. No. 7,395,207, which is a continuation of U.S. patent application Ser. No. 09/740,284, filed Dec. 19, 2000, now issued as U.S. Pat. No. 7,113,910, which claims priority from provisional U.S. Application No. 60/183,397 filed Feb. 18, 2000.

BACKGROUND OF THE INVENTION

1. Field of the Invention

This invention relates generally to methods and systems for document expansion. More specifically, the invention, relates to methods and systems for performing document expansion for speech retrieval.

2. Description of the Related Art

Increasing amounts of spoken communications are stored in digital form for archival purposes (e.g., broadcasts), or as a byproduct of modern communications technology (e.g., voice mail). Multimedia documents and databases are also becoming increasingly popular, e.g., on the World-Wide-Web (www). There has thus been an interest in developing tools for searching spoken information that complement existing methods for searching textual information.

With advances in automatic speech recognition (ASR) technology, it is now possible to automatically transcribe speech with reasonable accuracy. Once the contents of a speech database or the audio portions of a multimedia database are transcribed using a speech recognition system, traditional information retrieval techniques can be used to search the database. However, inaccuracies in automatic transcriptions pose several new problems for information retrieval (IR) technology in speech retrieval. For poor automatic transcriptions, retrieval effectiveness is much worse than effectiveness for human transcriptions. Due to various factors, including background non-speech sounds (noise, music), poor recording conditions, and disfluent or non-native speech, it is often not possible to get good automatic transcriptions even with the best ASR systems.

Even though IR techniques have been successfully used in retrieving corrupted text generated by optical character recognition (OCR) systems, the kinds of errors in automatic speech transcriptions are very different from those in OCR transcriptions. Since OCR systems usually operate with single characters, errors in character recognition usually produce illegal words which do not affect the retrieval process substantially. In contrast, current high-performance, large-vocabulary speech recognizers rely on word-pronunciation dictionaries and whole outputs consists only of legitimate words drawn from the dictionary. Recognition errors are then deletions, insertions or substitutions of legitimate words, and are therefore not easily discarded.

One of the main problems in performing word- and phrase-based speech retrieval with current methods arises due to poor index term assignments for automatic speech transcriptions. From its early days, the field of IR has wrestled with the question of which index terms should be assigned to a given document. Defining the concepts which a document is about, —"aboutness" in subject indexing—has been visited several times over the history of IR. Experimentation has shown that automatically-derived, uncontrolled index terms are competitive with carefully crafted manual index terms. Most modern IR systems use automatically derived words and phrases as index terms for documents. However, any indexing system, including word- and phrase-based automatic indexing, is imperfect and may thus fail to index the relevant documents under the query terms even though the documents are about those terms. This has often been called the "vocabulary mismatch" problem. This problem is made worse by speech recognition errors, since the automatic transcription of a document may not contain all the terms that were actually spoken, or may contain terms that were not spoken.

A secondary problem in index term assignment is deciding, for an index term assigned to a given document, the "degree" to which that document is about that term. Modern IR systems use sophisticated term-weighting methods to define the degree of aboutness of documents for different terms. When documents are corrupted, as is the case in speech retrieval, term-weighting schemes assign misleading weights to terms. This might also cause some loss in retrieval effectiveness.

Many devices and methods have been proposed over the years to attack the vocabulary mismatch problem, most notably the use of Thesaurii to enhance the set of index terms assigned to documents or to queries. However, obtaining a reliable Thesaurus for any subject area is quite expensive. Attempts have been made to harness word-to-word associations for automatic Thesaurus construction, but these attempts have been disappointing. More recently, however, it has been shown that enhancing queries with terms related to the entire concept of the query (often referred to as "query expansion"), and not just with words related to individual query words, reduces the problem of vocabulary mismatch considerably and consistently yields large improvements in retrieval effectiveness, especially for short queries.

Correspondingly, document expansion can be used to enhance the index term assignment for documents. Many studies have utilized enhanced document representations using bibliographic citations and references. Research on the use of spreading activation models in IR also aims at crediting documents based on activation of related documents. However, both these techniques need some human supervision (in the form of human generated citations, or the semantic net used) to be made operational.

Document clustering, which doesn't require any human supervision, can also be interpreted as a form of document expansion. When similar documents are clustered and a cluster representative is used in the search process, the cluster representative usually contains terms from all the documents in the cluster, in effect allowing a match between a document and a query (via the cluster representative) even when individual query terms might be missing from the document but are present in other documents in the cluster. Extensive studies on document clustering have given mixed results at best. Work on Latent Semantic Indexing (LSI) also produces similarly mixed results. LSI allows a match between queries and documents that might not share any terms in word-space, but do share some concepts in the LSI.

An alternative to word-based approaches is to recognize sub-word units (for instance, phonemes) and to use sequences of these sub-word units as index terms. However, it is unclear if the results from this approach are competitive with word-based approaches now that very-large vocabulary recognition systems are available. It is also possible to simultaneously use as index terms words from the best word transcription and phonetic n-grams from phoneme lattices.

There thus exists a long-felt, but unresolved need in the art for document expansion for speech retrieval systems. The methods and systems to perform this task should be versatile and efficient, performing speech retrieval in short periods of time. These results have not heretofore been achieved in the cut.

SUMMARY OF THE INVENTION

The aforementioned problems are solved, and long-felt needs are met, by methods of document expansion for speech retrieval documents by a recognizer provided in accordance with the present invention. The methods comprise accessing a database of vectors of automatic transcriptions of documents and truncating the vectors by removing all terms in the vectors that are not recognized by the recognizer, thereby creating truncated vectors. It is then preferable to change weights of terms in the truncated vectors to weights associated with the vectors before the vectors were truncated to form the truncated vectors, thereby creating truncated, weighted vectors and adding to the truncated, weighted vectors any terms which were not recognized by the recognizer.

The inventive methods enhance index representation for speech documents independently of the nature of the indexing units. The only precondition is that the speech documents to be searched must be transcribed and indexed in advance of query processing, rather than being transcribed and scanned at query-time. It is also possible to expand the speech documents prior to query processing Document expansion for speech retrieval in accordance with the invention yields significant improvements in retrieval effectiveness from speech. When speech recognition is of reasonable quality, retrieval effectiveness from automatic transcriptions with the inventive methods is quite comparable with retrieval effectiveness from human transcriptions. The inventive techniques are particularly useful when only poor automatic transcriptions are available. Document expansion in accordance with the present invention is very effective in this situation. Losses in retrieval effectiveness are reduced considerably; from 15 to 27% to about 7 to 13%.

The present invention provides methods for retrievement enhanced document representations from erroneous texts such as automatic speech transcriptions. With erroneous transcriptions, it is not clear whether the document is truly about the terms returned by the recognizer. However, documents can be found that are topically related to the spoken document in a textual sense, and words whose presence in speech is supported by topically related documents can be reinforced. In accordance with the invention, the importance of the words whose presence in the speech document is not supported by related documents can be reduced. In addition to this reweighing of recognized terms, transcription of some new terms from the related documents can be added, representing in-topic terms that could have been spoken but the recognizer failed to recognize. Re-weighing and addition of related terms, in accordance with the invention is especially effective when the expansion corpus is closely related to the spoken documents, for example in the case of a spoken corpus of news broadcasts and an expansion corpus of newspaper news articles of the same time period. These results have not heretofore been achieved in the art.

The invention will be best understood by those skilled in the art by reading the following detailed description of the preferred embodiments of the invention in conjunction with the drawings which are first described briefly below.

BRIEF DESCRIPTION OF THE DRAWINGS

In the drawings wherein like reference numerals refer to like elements throughout the several views thereof:

FIG. 2 depicts a table of word error rates for various speech document collections;

FIG. 4 depicts a table of degree of expansion for various constants in Rocchio's formula;

DETAILED DESCRIPTION OF THE PREFERRED EMBODIMENTS

Figure 1:
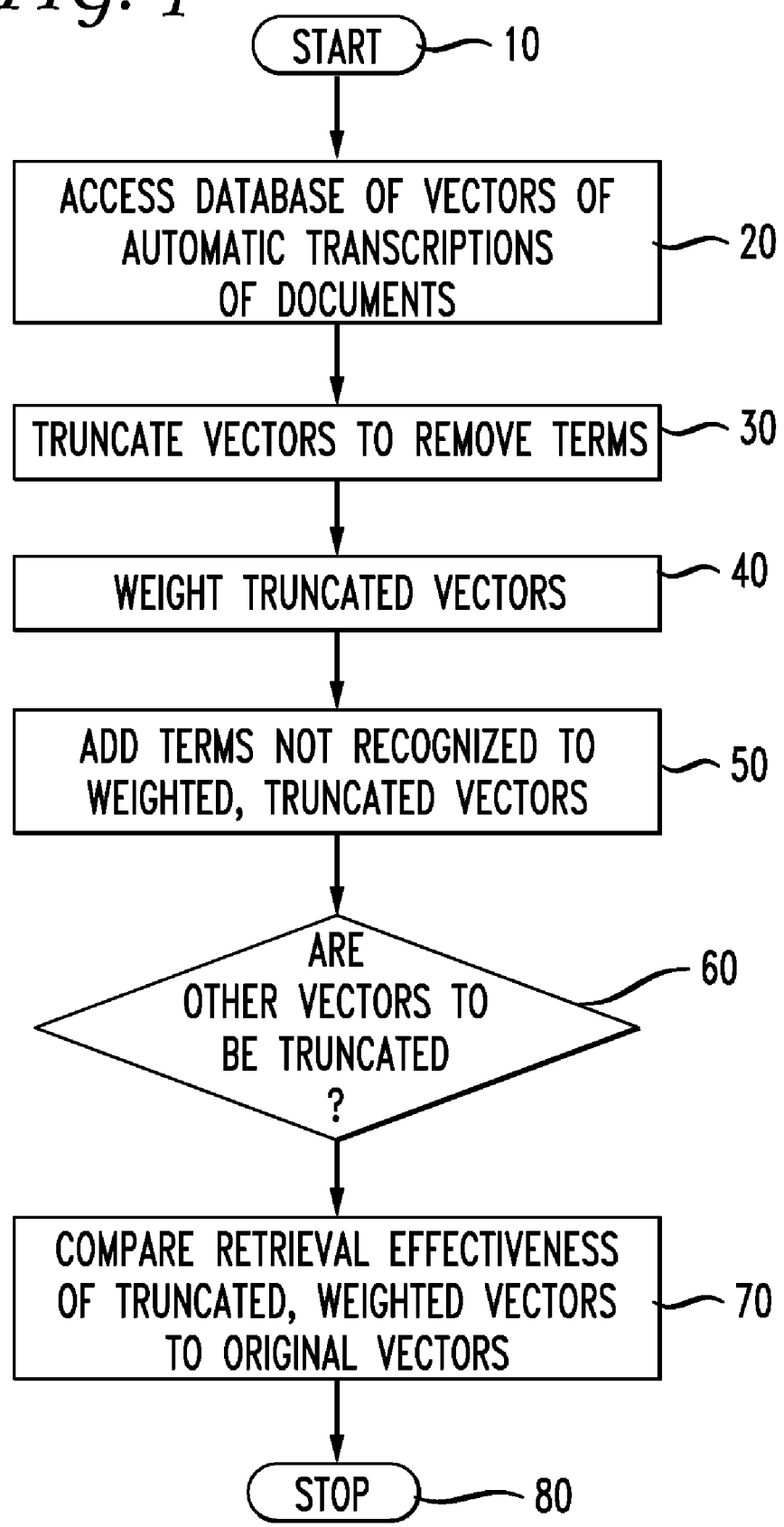
FIG. 1 depicts a flow chart of a preferred method of the present invention.

Referring now to FIG. 1, a flow chart of a preferred method for implementing the invention is depicted. It will be appreciated by those skilled in the art that the inventive methods may be programmed in software and run on an appropriate general purpose, digital computer. The software environment is any operating system, for example UNIX or WINDOWS, and the software programming language may be any of a number of languages such as C++, VISUALBASIC, JAVA, HTML or any other object oriented language known to those of ordinary skill. Any appropriate computer may run the software, for example, a COMPAQ PROLIANT server, or a server available from Sun Microsystems.

The method starts at step 10, and at step 20 it is preferable to access a database of vectors of automatic transcriptions of documents. At step 30, the vectors are truncated to remove terms from the documents which are not recognized by a recognizer, for example an individual posing a query to the system to retrieve documents about a specific subject. This produces a set of truncated vectors. At step 40, the truncated vectors are weighted with weights that are associated with the vectors before they were truncated. Truncation and weighting of the vectors in accordance with the invention will be discussed in more detail below.

Terms are then added to the weighted, truncated vectors at step 50 which were not recognized by the recognizer before the vectors were truncated. At step 60, it is then determined whether other vectors of transcribed documents exist which should be truncated. If so, then the method returns to step 20, and if not then the method goes to step 70 wherein the retrieval effectiveness for untruncated vectors is compared to the retrieval effectiveness for truncated, weighted vectors. The method then stops at step 80.

In a preferred embodiment, a speech collection corpus for the inventive methods comprises approximately 100 hours of radio/TV broadcast news recordings. Twenty-three sentence-length queries are manually segmented into 2,866 stories. Twenty-three sentence-length queries are supplied with this collection, along with their corresponding relevance judgements. These queries have anywhere between one to sixty relevant documents in the collection.

A non-interpolated average precision was used to evaluate retrieval effectiveness. However, average precision is quite volatile for queries that have very few relevant documents. For example, consider a query which has just one relevant document. If one system ranks the relevant document at rank 1 and another at rank 3, then for this query the average precision for the first system is 1.0 whereas it is just 0.33 for the second system. Such large differences for a few such queries can overshadow the overall average precision. To avoid this volatility, it is desired to remove queries that have fewer than five relevant documents in the test collection, and to perform the evaluation using the remaining queries.

To study the impact of document expansion on a wide variety of speech recognitions of varying accuracy, nine different sets of transcriptions were used. The inventive methods enhance the index representation for speech documents independently of the nature of the indexing units. The only precondition is that the speech documents to be searched must be transcribed and indexed, and possibly expanded, in advance of query processing, rather than being transcribed and scanned at query-time.

FIG. 2 depicts a table that lists the nine various transcription sets along with their word error rates ("WER"). In reality, the WER for human transcriptions is of course non-zero.

The weighting methods described by Singhal et al., AT&T at TREC-7, *Proceedings of the Seventh Text Retrieval Conference (TREC 7)* (1999), the teachings of which are incorporated herein by reference, and the term "weighted queries", were employed. These queries incorporate the "idf-factor" as described by Singhal et al. which is collection-dependent. It is preferable to hold the queries constant across various representations of documents. Therefore, the same idf for query terms is used across different sets of transcriptions. This idf-factor is the true idf of the term derived from the collection of human transcriptions of the speech data.

Long queries which are rich with content words yield better retrieval. Many techniques that are effective for short queries (like automatic query expansion) are not as effective for long queries. Therefore, it is useful to evaluate document expansion with one set of short queries, and another set of long queries. However, the queries provided by NIST for this collection are all sentence length, and are relatively short (average 7.1 terms per query). A content-rich long version of these queries was generated via pseudo-feedback on human transcriptions. Pseudo-feedback has been used in the past and has been quite successful over the last few years. Ten new words were added to each query, increasing the average query length to 17.1 terms per query.

From an IR system's perspective, a recognizer makes three kinds of mistakes for a document. 1): Deletions: No occurrence of a term occurring in the speech is recognized. 2): Weight Difference: A term in the spoken document is recognized, but with the wrong frequency, or the transcription length is incorrect. And 3) Insertions: A term not in the speech appears in the automatic transcription.

In a preferred embodiment, weighted documents were used. Due to a double-log normalized tf-factor as described by Singhal et al. used in the document weighting scheme, the effect of weight difference on retrieval effectiveness is minimal. To study the incremental loss due to word deletions, weight difference, and insertions, dnb-weighted document vectors as described by Singhal et al. for human transcriptions are taken, and the following steps performed:

First, remove from the document vectors for human transcriptions all terms that are not recognized by the recognizer. Comparing retrieval from these truncated vectors to that from the full vectors measures the effect of deletions on retrieval effectiveness.

Second, change the weights of the terms in the truncated vectors generated in the previous step to the weights they achieve in the indexed versions of the automatic transcriptions. Retrievals on these vectors measure the additional loss in retrieval effectiveness caused by incorrect weights being assigned to terms.

Finally, add all insertions to vectors generated in the previous step. This yields the final retrieval effectiveness using automatic transcriptions, and also measures the incremental loss due to insertions.

Figure 3:
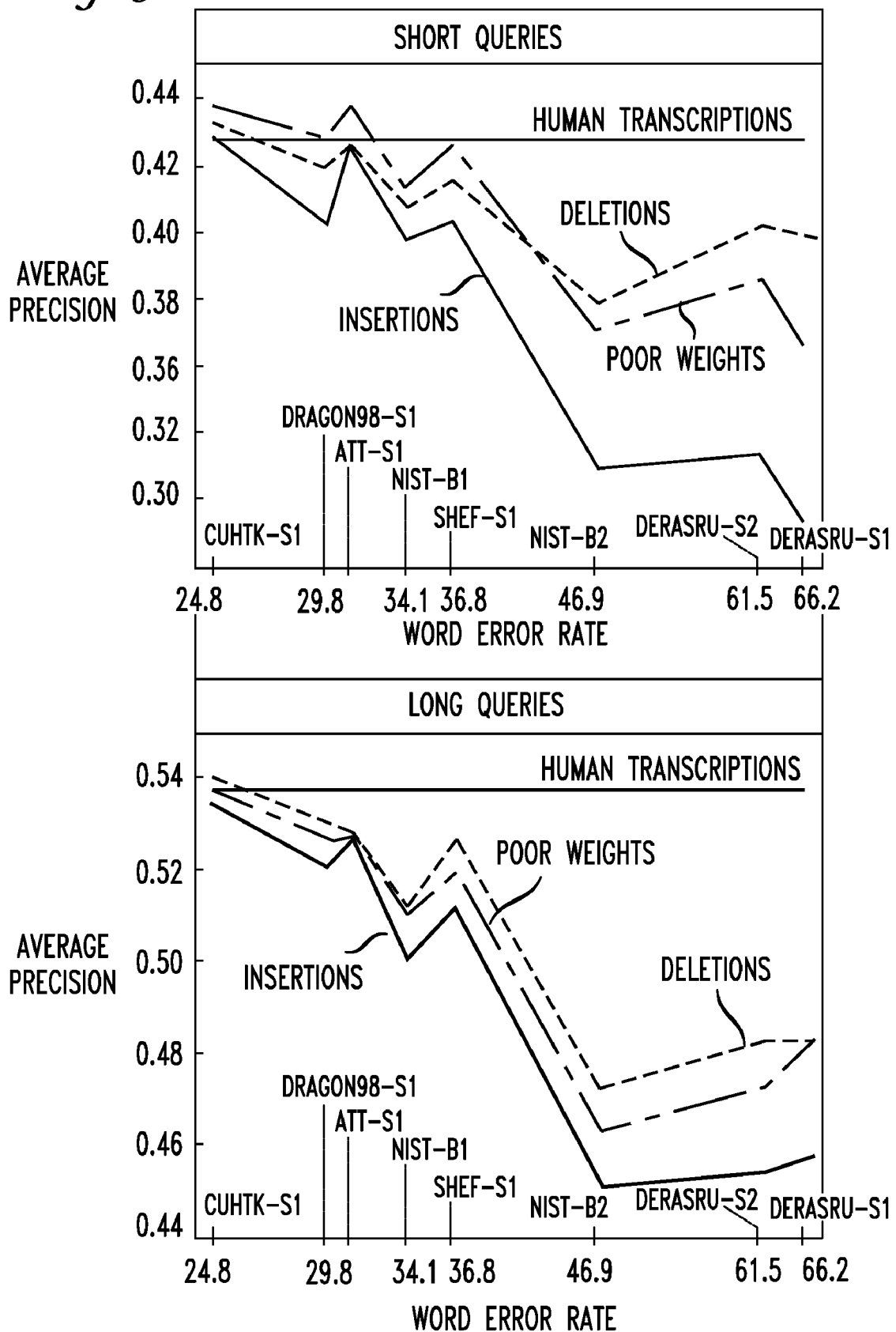
FIG. 3 depicts graphs of word error rates for short and long queries.

The graphs in FIG. 3 illustrate the results. The top graph is for short queries and the bottom graph is for long queries. The x-axis is word error rate, and the systems from left to right are ordered as per FIG. 2, the leftmost point is CUHTK-S1, the next one is Dragon98-S1, and the rightmost point is DERASRU-S1. The y-axis is non-interpolated average precision. Several interesting facts can be inferred from FIG. 3.

First, long queries are better than short queries. The average precision for human transcriptions is 0.5369 for long queries, whereas it is 0.4277 for short queries. This improvement in the quality of the queries is reflected in retrieval from all automatic transcriptions. For example, retrieval from DERASRU-S2 has an average precision of 0.3348 for short queries; this number rises to 0.4544 for long queries.

Second, loss of effectiveness is small for good transcriptions. Comparing the two solid lines—the horizontal one for human transcriptions and the other line for retrieval from various automatic transcriptions—the loss of effectiveness for reasonable automatic transcriptions is minimal. For both query sets, the effectiveness of retrieval from the best automatic transcription (CUHTK-S1) is almost the same as retrieval effectiveness for perfect text. The losses for other reasonable transcriptions (all but NIST-B2, DERASRU-S2, and DERASRU-S1) are all from 2 to 6%, which is minimal considering that these transcriptions have word error rates of up to 36%.

However, when recognition becomes noticeably poor, the retrieval effectiveness does fall about 22 to 27% for the short queries and about 15% for the long queries. This observation strongly advocates the use of long queries whenever possible. Use of long queries cuts the effectiveness difference between retrieval from human and automatic transcriptions.

For good transcriptions, the differences in retrieval effectiveness for human and automatic transcriptions are little to begin with, and break-up analysis for such small differences is not very meaningful. For the poor transcriptions, there is a noticeable loss in average precision due to word deletions (for both the short and the long queries).

Weight changes are less important. As was discussed above, the incremental loss due to poor term-weighting is relatively small. The main reason for this is the normalization of term frequencies done by the term weighting schemes used in modern IR systems, like the double-log normalized term frequency factor. A term that occurs tf times in a document is assigned a weight of 1+ln(1+ln(tf)) (ignoring document length effects). If a recognizer doesn't recognize the second occurrence of a word in a document, the loss in term weight is just 34% (its tf-weight becomes 1.0 instead of 1.5); whereas if a recognizer recognizes two out of three occurrences of a term, the loss in weight is just 12% (its tf-weight becomes 1.5 instead of 1.7).

Insertions matter for short queries. Further loss due to spurious words or insertions is quite noticeable for short queries, but it is relatively small for the long queries. Most of the loss for long queries is from deletions. This is evident in the bottom graph in FIG. 3 from the large gap between the dashed-line (labeled "deletions") and the horizontal line. In the same graph, the incremental loss due to insertions (the solid line marked "+Insertions") is not as large. This behavior is expected. When queries are short they have few terms, and one or two spurious matches (the main effect of insertions) can dramatically promote the rank of a document. But once the queries have enough context (via more terms), there is more to match, and one or two spurious matches do not effect the ranking much since the overall ranking is governed by the entire context in the query. Generally, it is difficult to separate insertions from spoken words, but the degree of deletions can be reduced by document expansion.

If an automatic recognition can be enhanced with words that could have been there but did not make it into the automatic transcription, then the resulting enhanced transcription should have fewer deletions, and losses due to deletions may be cut. From a speech recognition perspective, an acceptable way to bring new words into a document is through the use of alternative recognition hypotheses (for example by use of lattices or n-best transcriptions of a speech).

From an IR perspective, pseudo-feedback, which basically is nearest-neighbor based expansion, is a preferable way to bring related words into a text. In a preferred embodiment, document expansion using Rocchio's method is implemented and its effect on retrieval performance is studied. The main idea behind such document expansion is given a document, first find some documents that are related to the document at hand (its nearest neighbors), and then bring frequently occurring words from the related documents into this document. This process should be especially effective if the neighboring documents are from a text corpus that is closely related to the speech at hand.

To perform document expansion, select a collection of documents that will serve as the source of related documents. Preferably, the North American News corpus is used which is available from LDC (LDC Catalog Number: LDC95T21, see www.ldc.upenn.edu) as the source of related documents. The main motivation behind using this collection are: 1) it is similar in nature to the speech collection at hand (both primarily contain American news), and 2) it contains print news from the same time period as the test data.

Therefore, it is expected that reported speech in the collection also appears in this corpus. Since the test data is dated from June 1997 to January 1998, news is used dated from May 1997 to February 1998 (one month before and after) from the North American news corpus. The shorthand "NA News" is used throughout for this subset of the corpus.

Second, find documents related to a speech document. This is preferably accomplished by running the automatic transcription of the speech document as a query (raw-tf-x idf weighted) on the NA News corpus and retrieving the ten most similar documents used in this process. The automatic recognition of documents is weighted (instead of using, say, a logarithmic or a double-log tf-factor) when used as a query because it has been observed that the nearest neighbors found using raw tfxidf weighted documents yield the best expansion results. Third, the speech transcriptions are then modified using Rocchio's formula:

$$\vec{D}_{new} = \alpha \vec{D}_{old} + \frac{\sum_{i=1}^{10} Di}{10}$$

where $\vec{D}_{old}$ is the initial document vector. $\vec{D}_i$ is the vector for the i-th related document, and $\vec{D}_{new}$ the modified document vector. All documents are dnb weighted. Optionally new words are added to the document. For term selection, the Rocchio weights for new words are multiplied by their idf, the terms are selected, and the idf is stripped from a selected term's final weight. Furthermore, to ensure that this document expansion process does not change the effective length of the document vectors, which would change the results changed due to document length normalization effects, the total weight for all terms in the new vector is forced to be the same as the total weight of all terms in the initial document vector. Rocchio's formula is described in J. J. Rocchio, "Relevance Feedback in Information Retrieval", *The SMART Retrieval System*, Gerard Salton, editor, pages 313-323, Prentice Hall, Inc. (1971), the teachings of which are incorporated herein by reference.

Various parameters are involved in the document expansion process. In a preferred embodiment, ten nearest neighbors for a document are used. Various values for a were evaluated and the best picked. Once again, different values for the degree of document expansion may be evaluated. A typical parameter tuning run is detailed in FIG. 4 which shows the retrieval effectiveness for various a values when the document is expanded by 0% of its original length i.e., no expansion but the existing terms are reweighted, 10% of its original length i.e., if the original document has 60 indexed terms, then 6 new terms are added to the document, and 200% of its original length. For short queries, $\alpha=1.0$ with 100% expansion works the best for all transcriptions. For long queries, $\alpha=1.5$ or 2.0 with 50-100% expansion is the best. However, for these queries, the difference in retrieval performance with $\alpha=1.0$ and 100% expansion (the best parameter setting for short queries) was under 1% for most of the cases so it is preferable to use a expansion.

Figure 5:
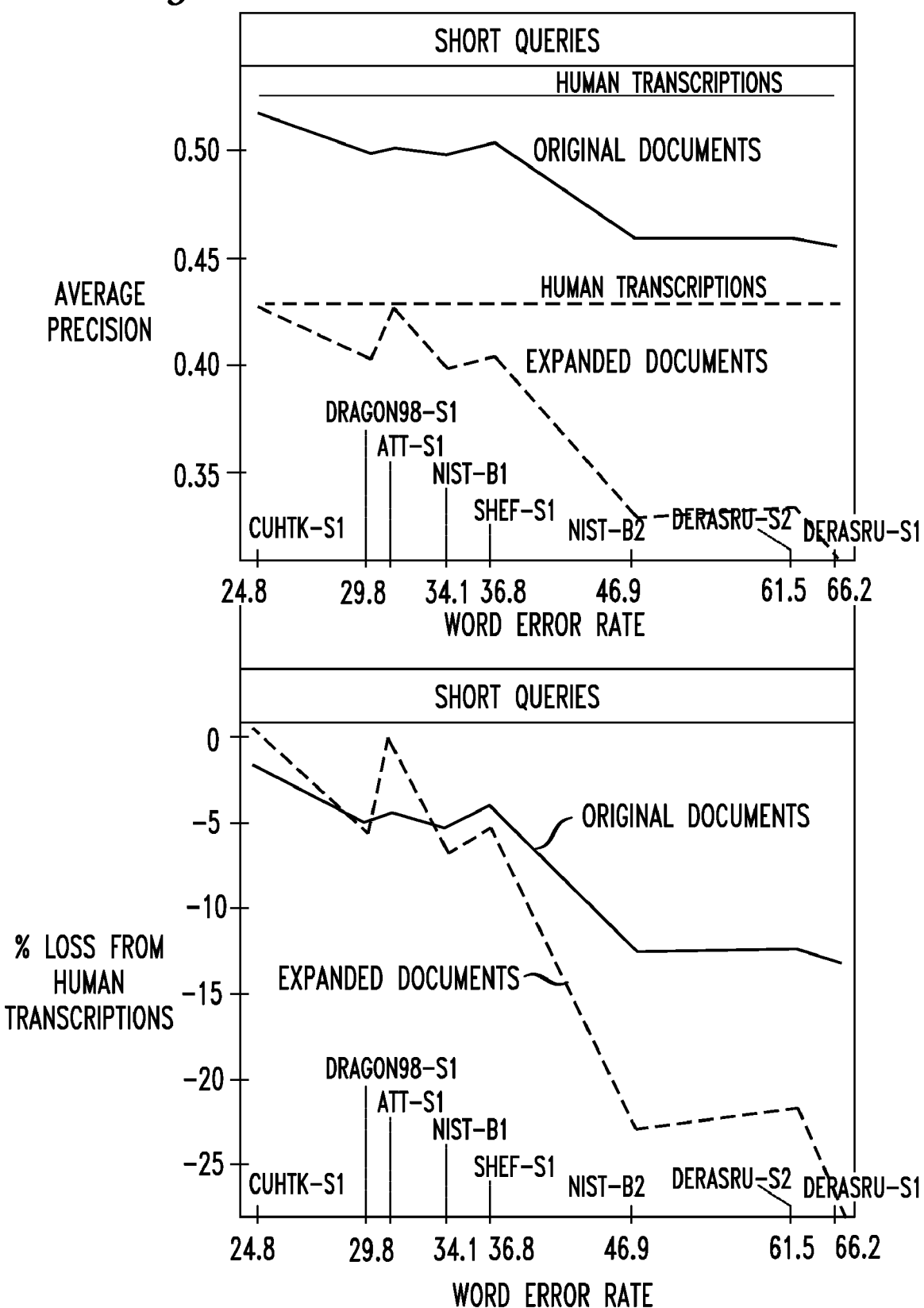
FIG. 5 depicts graphs of word error rates for a corpus of information.
Figure 6:
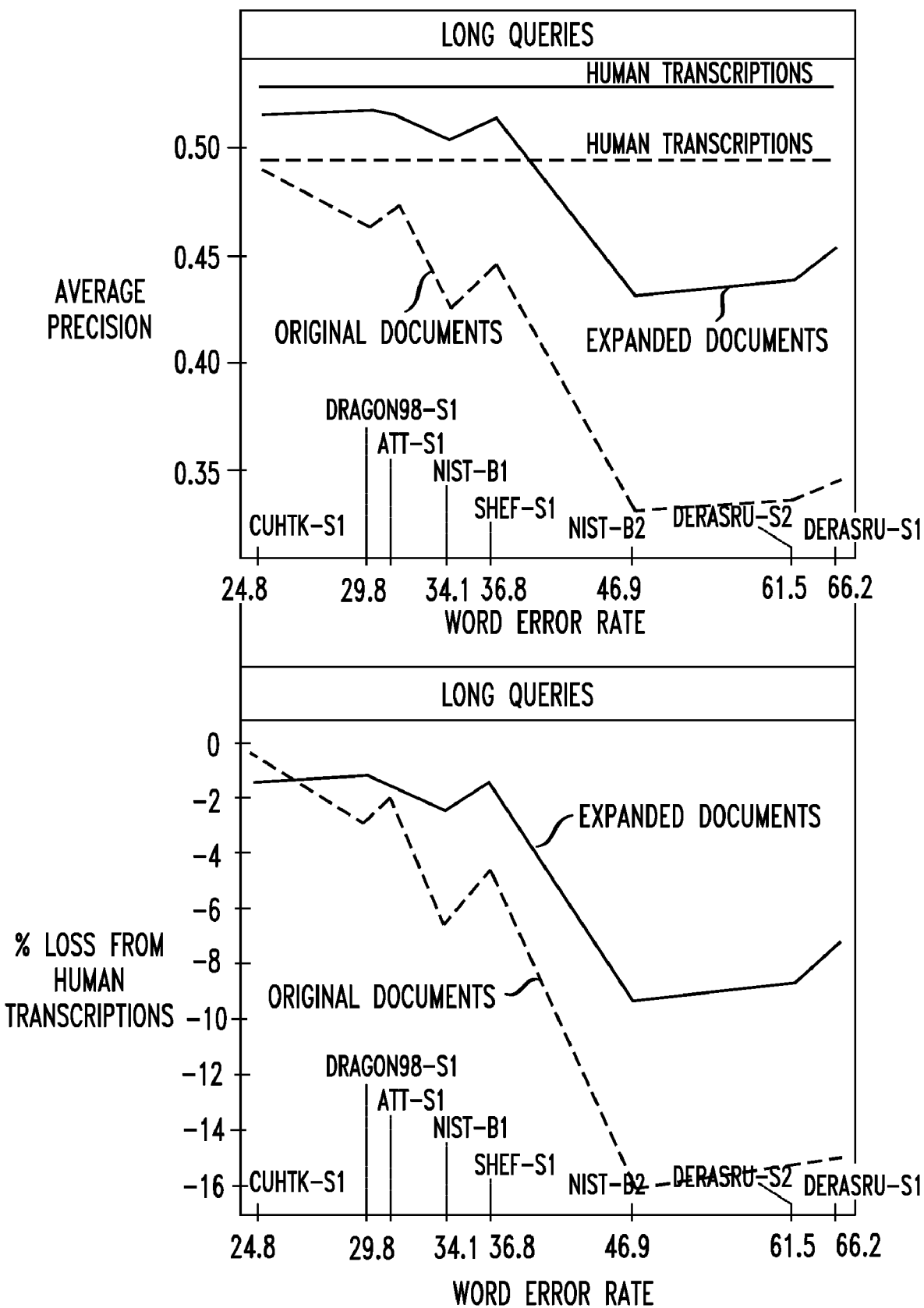
FIG. 6 depicts graphs of word error rates for a different corpus of information from that of FIG. 5.

Both the query sets (short and long) were run on the modified and the original documents and the average precision was measured. The results for the short queries are shown in FIG. 5, and those for the long queries are shown in FIG. 6. For a fair comparison, the results from expanded automatic transcriptions cannot be compared to unexpanded human transcriptions. It is possible that document expansion is generally helpful for this collection and it does not hold any added advantage for speech transcriptions. Therefore, the baseline for comparing expanded speech transcriptions results is the result from the expanded human transcriptions.

Many interesting facts can be observed from FIGS. 5 and 6. For short queries first, the top plot in FIG. 5 plots the average precision on the y-axis against the word error rates for various transcripts on the x-axis. The dashed lines are for unexpanded (original) documents, and are the same as the two solid lines in the top graph in FIG. 3. The solid lines are for the expanded documents. The horizontal lines correspond to the average precision for retrieval from human transcripts (dashed line) and expanded human transcripts (solid line).

First, it is observed that document expansion dramatically improves the average precision for short queries for all transcriptions. It is expected that document expansion will improve average precision for automatic transcriptions, but the 23% improvement for perfect text (the average precision jumps from 0.4277 to 0.5265) is quite unexpected. Previous studies have shown modest gains when spreading activation was used with five nearest neighbors of a document. Whether this effect will hold when applied to large text collections is still unclear. FIG. 5 shows that, similar to the human transcripts, document expansion also improves the retrieval effectiveness for automatic transcripts by a large margin. For example, the retrieval effectiveness for DERASRU-S1 transcripts (the rightmost point on the graphs) jumps from 0.3139 to 0.4576, a remarkable improvement of over 46% (0.3139 being the baseline).

The bottom graph in FIG. 5 shows that document expansion indeed is more useful when the text is erroneous. The dashed line on the bottom graph shows the %-loss in average precision when retrieval is done from unexpanded automatic transcriptions instead of unexpanded human transcriptions. This line has the same shape as the dashed line on the top graph since it is essentially the same curve on a different scale (0 to 100%, the human transcriptions being the 0% mark). The loss for CUHTK-S1 (the leftmost point) is close to 0% whereas it is 27% for DERASRU-S1 (the rightmost point). The solid line on the bottom plot shows the %-loss for various transcripts for expanded documents. The baseline for this curve is higher; it corresponds to the solid horizontal line on the top graph. This document expansion indeed benefits the poor transcriptions much more then it benefits the human or the better automatic transcriptions. For poor transcriptions, the gap in retrieval effectiveness reduces from 23% to about 13% for NIST-B2, from 22% to about 13% for DERASRU-S2, and from about 27% to about 13% for DERASRU-S1. All these loss reductions are quite significant.

In summary, document expansion is more useful for automatic speech transcripts than it is for human transcriptions. Automatic recognitions that are relatively poor need the most help during retrieval. Document expansion helps exactly these transcriptions, and quite noticeably even with word error rates as high as 65%, the retrieval effectiveness drops just 12-13% post document expansion. This drop would have been 22-27% without expansion.

Studying similar graphs for the long queries in FIG. 6, document expansion is once again beneficial for all transcripts, though not quite as much as it was for the short queries. For example, for human transcriptions, document expansion yields an improvement of 23% for short queries (over no document expansion). This improvement is just 3.5% for the long queries which is very much in-line with the improvements suggested by earlier studies that use nearest neighbors. This happens because when queries are short, they stand to gain from document enrichment done by expansion. On the other hand, when queries are already rich in content, like the long queries, the incremental benefits from enriched documents are minimal.

More interestingly, when documents are poor in content, like the automatic transcripts with many errors, document expansion is still beneficial despite the richness of the queries. Even with long queries, a marked improvement in retrieval effectiveness from poor transcription is achieved. The average precision improves about 12 to 13% for the three transcriptions with high word error rates (as opposed to just 3 to 5% for perfect text or the better transcriptions), and the gap is reduced to about 8% instead of the original 16%. Once again document expansion helps where help is needed the most, that is, for poor automatic transcriptions.

Figure 7:
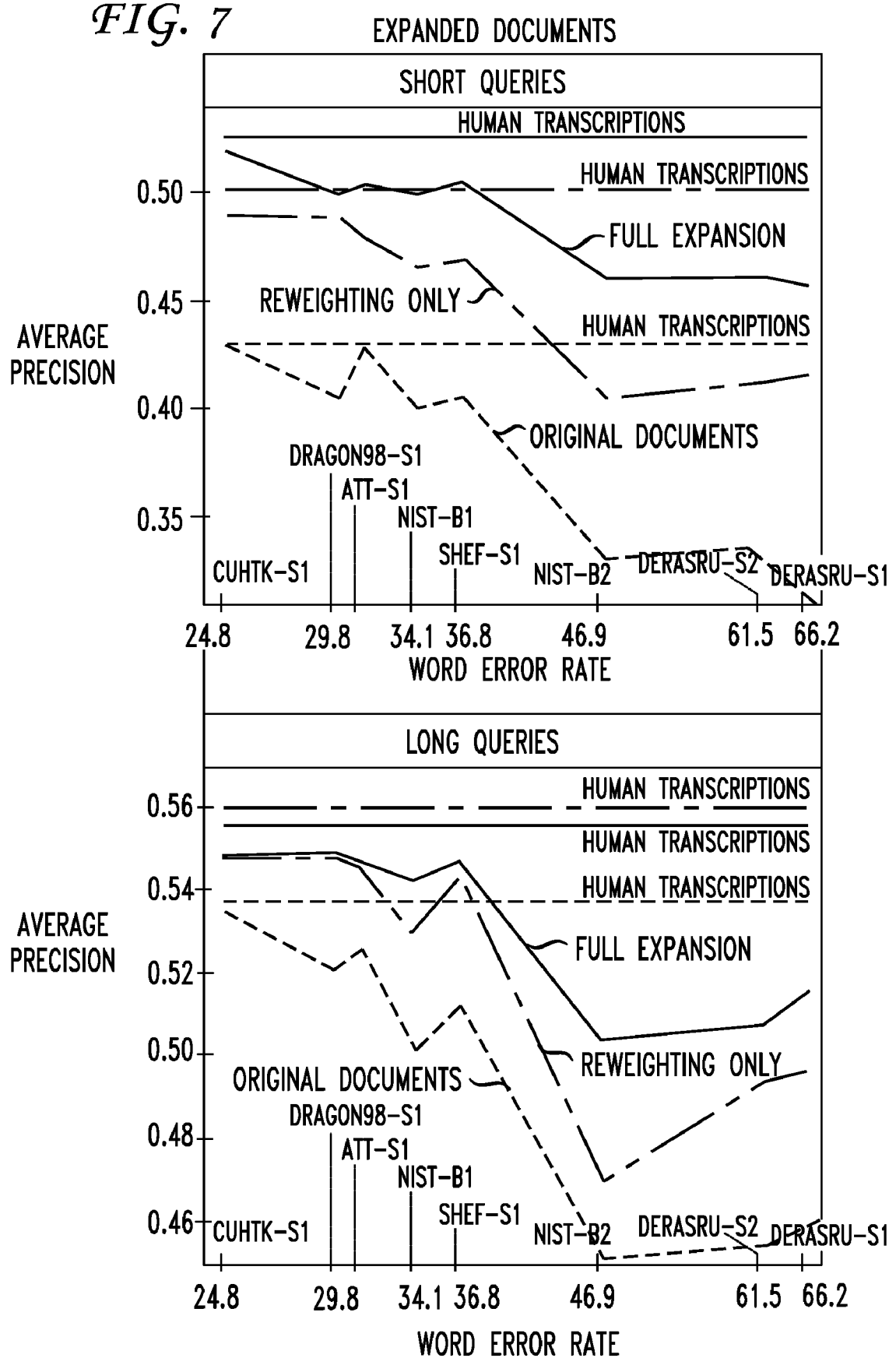
FIG. 7 depicts graphs of word error rates for a different corpus of information from that of FIGS. 5 and 6.

Document expansion has two effects on a document vector. First, Rocchio's method reweights the terms that already exist in the document. Second, it brings new words in the document. FIG. 7 shows the effects of reweighting only, and of adding new terms. The top graph is for short queries and the bottom graph is for long queries. Once again the x-axis is WER and the y-axis is average precision. The horizontal lines are for human transcriptions and the other lines are for various automatic transcriptions. For the top graph in FIG. 7 the dashed lines (original documents or no expansion) and the solid lines (full expansion) are the same as in the top graphs of FIG. 5; and in the bottom graph they correspond to the top graph of FIG. 6. The additional lines in FIG. 4 (drawn with dashes and dots) show the effect of reweighting only.

The horizontal lines in FIG. 7 show that for perfect text (human transcriptions), the majority of the improvements from document expansion are due to reweighting of the existing terms. For short queries, just by reweighting, the average precision jumps 17% from 0.4277 to 0.5017. This gain is about 4% for long queries. This is due to the redistribution of weights that occurs for the terms present in a document.

More specifically, all terms that appear equally often in a document get equal weights before reweighting, but the presence of some of these terms is supported by the nearest neighbors of the document, whereas the presence of other terms is not supported. After reweighting, this results in a higher weight for terms whose presence in the document is supported by nearest neighbors and vice-versa. For example, if a document is about automatic speech recognition, and the words "Markov" and "spectrum" both occur just once in it, the nearest neighbors for this document might support the presence of the word "Markov" more strongly than they would support the presence of "spectrum", yielding a higher weight for the word "Markov" in the reweighted document as compared to the weight of "spectrum". Put another way, there are some "signal" words in a document and there are some "noise" words. Document reweighting based on nearest neighbors emphasizes the signal words and it de-emphasizes the noise words yielding a better overall term weight assignment for the document.

Adding new terms to the documents adds another 6% for the short queries yielding a final average precision of 0.5265 (a 23% improvement over 0.4277). Adding new terms to documents has the same effect as using long queries. When queries are indeed long, no improvement due to adding new terms to documents is achieved. Adding new terms to documents actually results in a small loss when queries are long (see horizontal lines in bottom graph of FIG. 7).

The effects of reweighting the existing terms is similar for all automatic speech transcriptions, i.e., a large improvement is achieved in retrieval effectiveness when certain words, which the document is truly about, receive higher weights. Adding new terms to the automatic transcriptions is more useful than it is for human transcriptions. Overall, adding new terms does not hurt for speech transcriptions, and is marginally to noticeably useful. This result is important since it shows that addition of new terms helps automatic transcripts (it helps noticeably when the transcripts are poor), even though it might hurt the perfect transcriptions (as it does for the long queries).

The above results show that when a text corpus is used which is reasonably close to the speech corpus in content type, then document expansion is truly beneficial for speech retrieval. To study the effect of document expansion when it is performed from a corpus that does not closely relate to the speech at hand, a large corpus of about 5.2 Giga-bytes containing 1,634,976 documents from various sources (news and non-news) was examined. The news material in this corpus is from the years 1987-1994 and has little overlap with the news topics covered in the speech corpus (which is dated from June 1997 to January 1998).

The document expansion from this corpus is not as beneficial as it is from the closely related NA News corpus. For example, when documents were expanded from NA News, the average precision for retrieval from perfect text using short queries jumped 23% from 0.4277 to 0.5265; but when documents are expanded from the new corpus, this increase is just 12% (from 0.4277 to 0.4828). Document expansion actually hurts retrieval effectiveness for long queries; about 7% in average precision as opposed to a 3.5% gain for NA News.

More importantly, the performance gap between the human and the ASR transcripts is not reduced as significantly as it was when documents were expanded from NA News. For example, for the short queries and NIST-B2 transcripts, the gap now reduces from 23% to just 20% (whereas it reduced to 12% for NA News). This situation is worse for long queries for which this gap doesn't change much for most of the transcripts. Document expansion is still useful for all transcripts when queries are short, though not as much; whereas it has almost no effect when queries are long.

Further analysis shows that most of the effect of document expansion is due to reweighting of the existing terms. For the long queries, bringing in new terms doesn't help much (it either helps or hurts about 1%). However, for the short queries, it still does help (about 2 to 7% depending upon the transcripts), though much less than expansion from NA News. Changing the parameter values for document expansion changes the results greatly. Overall, it appears that the effectiveness for document expansion for better retrieval is largely dependent upon having a text collection for document expansion that is closely related to the speech at hand.

Yet another possible source for document expansion is the speech corpus itself. In this scenario, the nearest neighbors of a speech document will be other speech documents. This would completely eliminate the need for an external text collection for performing document expansion. Document expansion from this corpus itself is not very effective. The main problem is the small size of this corpus.

Thus, document expansion from a text collection closely related to the speech at hand yields substantial benefits for speech retrieval, reducing the performance gap between retrieval from perfect text and from automatic speech transcriptions. Retrieval from reasonable speech transcriptions is competitive with retrieval from perfect text. Document expansion helps where help is needed most, namely, for poor automatic transcriptions. On the other hand, expansion from unrelated corpora is not nearly as beneficial.

Moreover, retrieval using long queries is more robust against speech recognition errors. Term insertion by a speech recognizer is not a significant problem if the queries have enough context (long queries). Furthermore, when using modern term weighting schemes the losses incurred due to improper values for terms that were actually spoken and were also recognized are minimal.

While there have been shown and described and pointed out certain novel features of the present invention as applied to preferred embodiments thereof, it will be understood by those skilled in the art that various omissions and substitutions and changes in the methods and apparatus described herein, and in their operation, may be made by those skilled in the art without departing from the spirit and scope of the invention. It is expressly intended that all combinations of those elements and/or method steps which perform substantially the same function in substantially the same way to achieve the same results are within the scope of the invention. Substitutions of method steps and elements from one described embodiment to another are also fully intended and contemplated. It is the intention, therefore, to be limited only as indicated by the scope of the claims appended hereto.

The invention claimed is:

1. A method of evaluating effectiveness of speech retrieval of documents, the method comprising:
removing terms in vectors that are not recognized by a recognizer, the vectors being associated with automatic transcriptions of documents;
generating weighted vectors by modifying weights of terms in the vectors;
adding to the weighted vectors terms which were not recognized by the recognizer;
receiving a plurality of speech queries for the documents, wherein the speech queries are based on the weighted vectors; and
determining effectiveness of the received plurality of speech queries based on queries in the plurality of speech queries which result in a number of relevant documents equal to or greater than a predetermined threshold.

2. The method of claim 1, wherein the documents relate to a first document based at least on a frame of time.

3. The method of claim 2, wherein the documents relate to the first document based at least on the fact that the first document and the documents both relate to a news corpus.

4. The method of claim 2, the method further comprising modifying the first document by expanding the document to be larger than its original length.

5. The method of claim 2, the method further comprising adding at least one word from the documents to the first document.

6. The method of claim 5, wherein adding the at least one word further comprises identifying frequently occurring words from the documents and adding the frequently occurring words to the first document.

7. The method of claim 2, the method further comprising running an automatic transcription of the first document as a query on the collection of documents to retrieve related documents from the documents.

8. The method of claim 7, wherein the automatic transcription of the first document is weighted when used as the query.

9. A non-transitory computer-readable storage medium storing instructions which, when executed by a computing device, cause the computing device to evaluate effectiveness of speech retrieval of documents, the instructions comprising:
removing terms in vectors that are not recognized by a recognizer, the vectors being associated with automatic transcriptions of documents;
generating weighted vectors by modifying weights of terms in the vectors;
adding to the weighted vectors terms which were not recognized by the recognizer;
receiving a plurality of speech queries for the documents, wherein the speech queries are based on the weighted vectors; and
determining effectiveness of the received plurality of speech queries based on queries in the plurality of speech queries which result in a number of relevant documents equal to or greater than a predetermined threshold.

10. The non-transitory computer-readable storage medium of claim 9, wherein documents relates to a first document based at least on a frame of time.

11. The non-transitory computer-readable storage medium of claim 10, wherein the documents relates to the first document based at least on the fact that the first document and the documents both relate to a news corpus.

12. The non-transitory computer-readable storage medium of claim 10, the method further comprising adding at least one word from the documents to the first document.

13. The non-transitory computer-readable storage medium of claim 12, wherein adding the at least one word further comprises identifying frequently occurring words from the documents and adding the frequently occurring words to the first document.

14. The non-transitory computer-readable storage medium of claim 10, the instructions further comprising running an automatic transcription of the first document as a query on the collection of documents to retrieve related documents from the documents.

15. The non-transitory computer-readable storage medium of claim 14, wherein the automatic transcription of the first document is weighted when used as the query.

16. A system for evaluating effectiveness of speech retrieval of documents, the system comprising:

removing terms in vectors that are not recognized by a recognizer, the vectors being associated with automatic transcriptions of documents;

generating weighted vectors by modifying weights of terms in the vectors;

adding to the weighted vectors terms which were not recognized by the recognizer;

receiving a plurality of speech queries for the documents, wherein the speech queries are based on the weighted vectors; and determining effectiveness of the received plurality of speech queries based on queries in the plurality of speech queries which result in a number of relevant documents equal to or greater than a predetermined threshold.

* * * * *